United States Patent [19]

Gaboury

[11] 4,002,942
[45] Jan. 11, 1977

[54] PROCESS FOR JOINING ELECTRODES AND PRODUCT RESULTING THEREFROM

[76] Inventor: Ronald F. Gaboury, 3360 Belvedere St., Brossard, Quebec, Canada

[22] Filed: July 7, 1975

[21] Appl. No.: 593,837

[52] U.S. Cl. .................................. 314/60; 13/18; 219/145

[51] Int. Cl.² .......................................... H05B 7/14

[58] Field of Search .......... 13/18; 314/60; 219/145; 174/94 S; 403/DIG. 5

[56] References Cited

UNITED STATES PATENTS

| | | | |
|---|---|---|---|
| 2,039,167 | 4/1936 | Hopkins | 219/145 X |
| 2,837,447 | 6/1958 | Weindel | 13/18 X |
| 3,251,926 | 5/1966 | Click et al. | 13/18 X |
| 3,297,903 | 1/1967 | Riek | 13/18 X |
| 3,313,976 | 4/1967 | Lauzau et al. | 13/18 X |
| 3,359,449 | 12/1967 | Trask | 13/18 X |

*Primary Examiner*—R. N. Envall, Jr.

[57] ABSTRACT

A process to form a positive electrode of an arc by joining two principal carbon-base electrodes and the product resulting therefrom. The two principal electrodes are axially perforated at one of their ends to tightly receive a small secondary electrode which fills the perforations. The small secondary electrode is a mixture of carbon and graphite covered with a copper layer. The material of the three electrodes is compatible so as to operate at an optimum temperature, amperage and color which are essentially the same for use in a cinematographic projector.

5 Claims, 5 Drawing Figures

PROCESS FOR JOINING ELECTRODES AND PRODUCT RESULTING THEREFROM

The present invention relates to carbon-base electrodes for use in cinematographic projectors and in particular to the joining of two such electrodes to form a positive electrode.

In the cinematographic industry, it is well known that the electrodes are only used in part for the projector using an arc as an illuminating source. The remaining tips of the electrodes are not used because they are not sufficiently long for the uninterrupted illumination of a whole reel of film and are therefore thrown away. Even the movie goers know that a film is not interrupted for the purpose of replacing the electrode in a projector. The present practice is therefore to use a new electrode for each reel of film which is projected. The electrodes which are generally sold on the market have a diameter of 11mm. and an average length of 20 inches. The average length of electrode used for a reel having 1 hour duration is 15 inches. This includes four inches for the feeding mechanism of the electrode. It is important to start the projection with an electrode which has a length which is longer than the minimum required. First, it is important to be sure that the length of the electrode will be sufficient under any circumstances so as to prevent any interruption, particularly when the reel of film is complete. Furthermore, the mechanism whih feeds the electrode and which maintains the orientation of its axis requires that this control must be made over a non-utilized length of the electrode which is approximately four inches. It therefore results that tips of 4, 5 and 6 inches are regularly thrown in the garbage and in no way recuperated. These dimensions may vary according to the feeding mechanism and the amperage used.

Various solutions have been tried to reduce the lost but many of them are not economical. For example, a metallic sleeve has been mounted on the end of the electrodes so that the feeding mechanism may bring the electrode per se further and therefore consume a longer proportion. The remaining part is nevertheless three inches because one must remember that these electrodes consume themselves at a temperature of approximately 2,000° F. and that the sleeve and the feeding mechanism cannot be brought very close to the burning portion.

Means have also been foreseen to join electrodes in the case of electric furnaces but the latter use sleeves on the outer portion of the electrodes. These connection means are inefficient in the case of cinematographic projectors because the latter must be cylindrical and cannot accept a covering sleeve or some form of wrapping. They must support their own weights and in certain projectors, they must be fed while spinning on themselves by using feeding rollers which are adapted to the exact diameter of the electrodes. Therefore, this requirement completely excludes the use of outer connections to the electrodes because it could not pass through the feeding mechanism. Even if such a connection could pass through the feeding mechanism, it would be desintegrated by heat before reaching the precise location of the combustion in the projector.

The problems to be solved in the field of cinematography are more requiring because one must maintain a constant color and intensity of light during the transition of the two joined electrodes. Light sources which would scintillate, flicker, weaken or which would change in color are not acceptable. Furthermore, electrodes for electric furnaces are generally made of carbon or a uniform mixture of carbon and graphite while the electrodes of cinematographic projectors are constituted preferably of a graphite nucleous covered with a carbon sleeve.

Following numerous experiments, it became possible to determine conditions to obtain satisfactory results for cinematographic purposes when two electrodes are joined one to the other. It is important that the link or the secondary electrode which connects the two principal electrodes be constituted of a product which is similar in nature to the principal electrodes, that is, it must have a carbon-base and that the link has an acceptable illumination at the same temperature and the same amperage as the one of the principal electrodes to be joined, and furthermore, it is important that all the parts of the connecting link must burn essentially at the same speed.

Another method consists in drilling an axial hole at each end of the adjacent portions of the electrodes and in introducing a secondary electrode in these holes so as to fill them. In such a case, it consists in using a secondary electrode having characteristics compatible with the principal electrodes as explained above. The majority of the electrodes used for illumination in cinematographic projectors is constituted by a graphite rod molded in tubular envelope of carbon. The secondary electrode is made of a small rod constituted of a mixture of carbon and graphite having a diameter, the latter to be pressed-fit in the perforated holes at the end of the two principal electrodes which must be connected. The composition of the secondary electrode is tightly compressed and is preferably covered with copper so as to prevent the crumbling during its penetration into the holes. The copper is also useful as an electrical conductor.

The invention will now be described by referring to drawings, in which.

Figure 1:
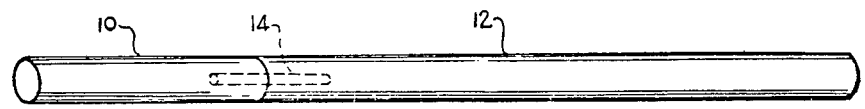
FIG. 1 is a perspective view of two joined electrodes.

FIG. 1 shows an electrode 10 and an electrode 12, both made of a mixture of carbon and graphite and connected by a small secondary electrode 14 which is itself made of a similar mixture. Each electrode 10 and 12 is perforated or drilled axially with a twist drill. The diameter of the hole obtained is slightly smaller than the diameter of the electrode 14 so that the latter may enter by force without leaving any space between the ends of the two electrodes 10 and 12.

Figure 2:
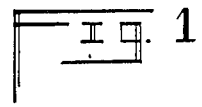
FIG. 2 is a perspective view of two separated electrodes showing the connection.

A second embodiment consists of two electrodes 20 and 22 of FIG. 2 which are made of a graphite rod 24 and a carbon sleeve 26 tightly compressed over the rod 24. One end of each of the electrodes 20 and 22 is perforated in a manner similar to the embodiment shown in FIG. 1 so as to insert the electrode 28. The latter is pressed-fit, such as by the use of a hammer in the electrode 22 and the electrode 20 is subsequently introduced over the electrode 28 in a similar manner. Due to the shockes and the pressure exerted on the electrode 28, it is an advantage to cover the latter with a layer of copper 28a which protects it against crumbling. This copper layer has the advantage to be fitforming during the penetration of the electrodes. Furthermore, the characteristic of the metal enables a better electrical and thermal conduction when the electrodes are electrically connected and are heated at a very high temperature. Certain electrodes of the type 20 and 22 may also be covered with a layer of copper.

Although this invention enables to connect electrodes, its purpose is to make possible the use of electrode tips presently disregarded in cinematographic projectors because they are not burnt completely. The mechanisms used for feeding the electrodes cannot make the latter advance beyond a certain distance because they are made of metal and the electrodes consume themselves at a temperature approximately of 2,000° F. A lost of 10% to 25% of the length of the electrodes is regularly expected and may even go up to 33%. According to FIGS. 2, 3 and 4, the electrode 20 is a remaining tip of an electrode already used. When joined to the electrode 22, it will be totally burnt. The same will be achieved for the remaining portion of the electrode 22 which will be joined to another new electrode. Also, two or three tips remaining from consumed electrodes could be joined. Therefore, every inch of the electrodes will be consumed 100%.

Figure 3:
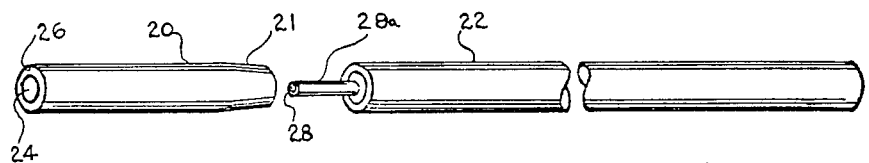
FIG. 3 is a longitudinal sectional view of two joined electrodes.
Figure 4:
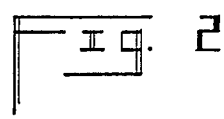
FIG. 4 is an exploded view of FIG. 3.

A concrete embodiment of the invention consists in the economy of the positive electrode tips for cinematographic projectors sold by Union Carbide Co., Pearless Carbon Co. or others. It consists of a type having a diameter of 11 mm. and a length of 20 inches as illustrated in FIGS. 2, 3 and 4. The outer sleeve 26 is made of carbon and the center 24 made of graphite, the latter having a diameter of approximately 5 mm. The electrode tips are between three to 6 inches and are shown by numeral 20. As illustrated, the tips which have been used have a reduced perimeter 21 at the end due to the erosion caused by the burning heat. The end of the electrodes 20 and 22 is perforated by using a twist drill having a diameter slightly smaller to 5/32 inch and a length of approximately one half to three fourths of an inch. This type if electrode which operates in the optimum conditions, has an amperage of $115 \pm 35$ amperes and a temperature of approximately 2,000° F. The optimum temperature which is function of the amperage is important because if it is too high, the electrodes will melt and if it is to low the flame will scintillate. In addition to the variation of the luminous intensity, such a scintillation may cause the breaking of the reflector of the projector.

In order to join two electrode tips, as described above, the secondary electrode 28, having a diameter of 5/32 inch and a length equal or slightly smaller than the sum of the length of the two holes 27 and 29 is entereed by force in the said holes (see FIG. 4) until the two electrodes 22 and 20 contact each other. This electrode 28 is constituted of a mixture of carbon and graphite so that the composition will have an optimum amperage and temperature similar to the electrodes 20 and 22. Furthermore, it is important that the flame produced by the connection will not cause appreciable change of color. In the present example, the electrode 28 may be a carbon arc electrode of the type carbon guaging electrodes sold under the trademark "Aircair" and sold by Canadian Liquid Air Ltd.

As mentioned above, the electrode 28 is pressed-fit in the holes 27 and 29 and particularly with the use of a hammer. The electrode 28 identified above is very hard and can stand a high impact. However, it is advantageous to use an electrode 28 with a copper layer 28a to reduce the crumbling or flaking, which would result in cavities around the electrode 28. This metal layer 28a increases the electrical conductivity between the electrodes and copper, in particular, being very malleable, allows a smoother penetration of the small electrode 28.

Figure 5:
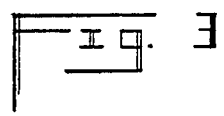
FIG. 5 is a perspective view of an embodiment of a secondary electrode.

Another embodiment of the secondary electrode is illustrated in FIG. 5. The secondary electrode 30 is foreseen as having a diameter slightly smaller than the holes provided in the principal electrodes. Over each end of the electrode 30, a small thin strip 32 and 34 made of copper is disposed over a portion of the periphery of the electrode 30. The length of these strips is foreseen so that their ends touch each other approximately at the median transversal plane of the electrode 30. The diameter of the electrode 30 plus the thickness of two layers of the strip 32 or 34 is made slightly greater than the diameter of the holes in the principal electrodes so that the penetration will require sufficient pressure to prevent undesired disengagement of the principal electrodes. It is obvious that these strips could be small cylindrical sleeves.

The above mentioned example refers to principal electrodes having a diameter of 11 mm. and to a secondary electrode of 5/32 inch in diameter. Successful tests have also been made with principal electrodes having a diameter of 13 mm. and a secondary electrode of 3/16 inch in diameter.

Figure 6:
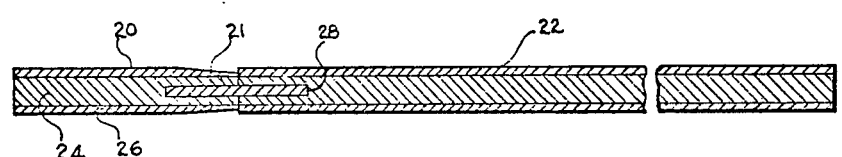
FIG. 6 is an exploded longitudinal sectional view of two electrodes according to another embodiment of the invention.

According to the substance of the invention, the connection must be compatible with the electrodes to be joined. Accordingly, it would be possible to sharpen the two ends of electrodes 40 and 42 according to complementary shapes 44 and 46 as illustrated in FIG. 6. However, these complementary conical shapes or other similar shapes are difficult to obtain if one desires a solid retention. This retention is particularly important when the feeding mechanism for the electrodes operates by traction on the electrodes. The disengagement of the electrodes would then cause a break in the illumination.

What I claim is:

1. A process for joining two principal carbon electrodes for forming a positive electrode of an arc in the illumination of a cinematographic projector, the said principal electrodes each consisting of a core and of sleeve surrounding and adhering to said core, the said process comprising the following steps:
    a. perforating an axial smooth wall blind hole at one end of each of the two principal electrodes solely in the core thereof;
    b. joining the said two principal electrodes end to end by introducing a smooth surface secondary electrode into the two blind holes of the said two principal electrodes until the ends of said two principal electrodes directly contact each other, the said secondary electrode being constituted of a material similar to that of the said principal electrodes, the said secondary electrode having a diameter to tightly fit into the said blind holes to maintain a retention of the said three electrodes together.

2. A combination of two principal carbon electrodes and a secondary carbon electrode for illumination use in a cinematographic projector, the said principal electrodes each constitutes of a core and of a sleeve surrounding and adhering to said core, at least one end of each principal electrodes being provided with a smooth wall cylindrical axial blind hole of a diameter less than the diameter of the core and solely made axially in said core, the secondary electrode being cylindrical and smooth wall, having a diameter slightly greater than the diameter of said blind holes and made of a carbon material similar to that of said principal electrodes, said secondary electrode inserted into the blind holes of said two principal electrodes with the bored ends of the latter in direct contact with each other, said secondary electrode being press-fitted within said blind holes and joining the two principal electrodes in end-to-end relation.

3. A combination as claimed in claim 2, wherein the secondary electrode is covered with a copper coating to improve the electrical conductivity between the secondary electrode and the principal electrodes.

4. The combination of claim 2, wherein said secondary electrode has a length varying between six and ten times its diameter.

5. A combination of claims 4, wherein the ends of said secondary electrode are in direct contact with the respective bottoms of said blind holes.

* * * * *